June 30, 1959 L. C. THAYER 2,892,976
MEASURING CELL
Filed April 11, 1955
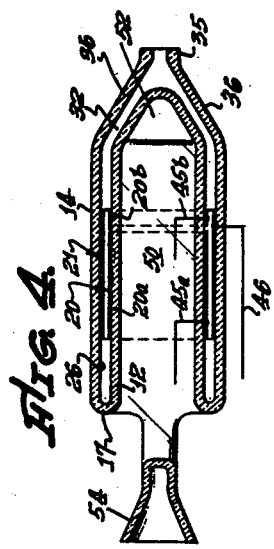
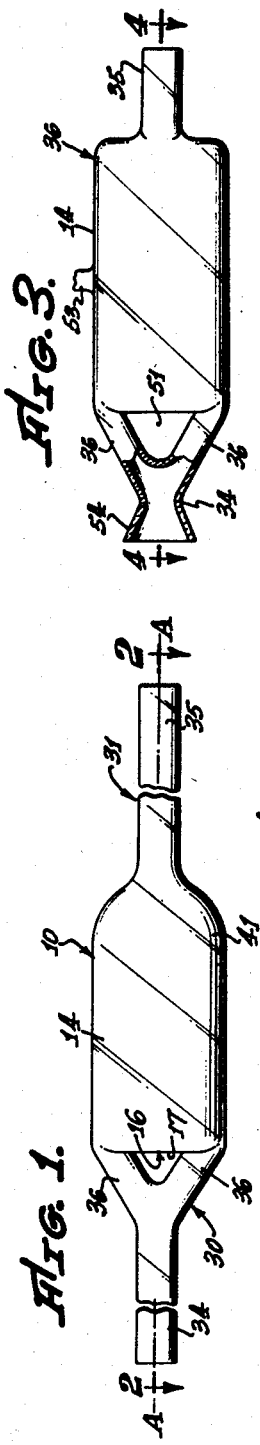
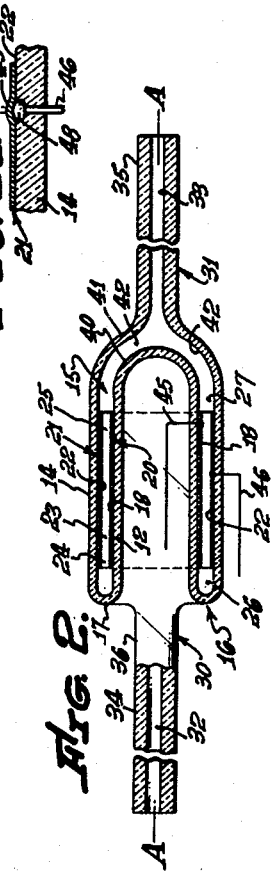
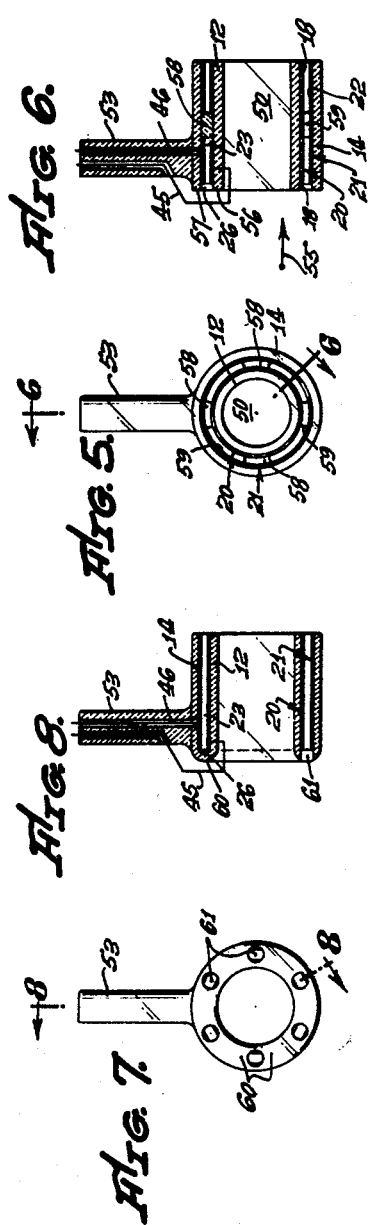
Louis C. Thayer,
INVENTOR
By His Attorneys.
Harris, Kiech, Foster & Harris

United States Patent Office

2,892,976
Patented June 30, 1959

2,892,976

MEASURING CELL

Louis C. Thayer, Duarte, Calif., assignor, by mesne assignments, to Beckman Instruments, Inc., Fullerton, Calif., a corporation of California Application April 11, 1955, Serial No. 500,640

8 Claims. (Cl. 324—30)

This invention relates to conductivity cells and, more particularly, to a new and improved cell particularly useful in the testing of fluids while in flow therethrough. While designed principally to measure conductance of such flowing fluids, the cells of the invention can also be used to measure dielectric constants, resistivities or other electrical properties of liquids or liquid mixtures.

An important object of the invention is to provide measuring or test cells of this type that are sturdy, relatively simple, compact and dependable in continuous service; also of long life and immune to attack by corrosive fluids.

A further important object is to provide such cells in which the cell constant does not change perceptibly with change in temperature. The cell constant is the number obtained by dividing the distance separating the electrodes by the area thereof. In previous cells, the shape and composition of the material supporting and separating the electrodes have frequently been responsible for substantial changes in cell constant with change in temperature due to change in electrode spacing. Occasionally, expansion or contraction of the electrodes themselves has given rise to change in cell constant. Such factors have led to inaccuracies or to the necessity of introducing corrective calculations. For concentric cylindrical electrodes the cell constant varies as the logarithm of the ratio of the radii of the outer and inner electrodes. By suitable design, the two radii can be made to increase and decrease proportionally with change in temperature so that there is no change in the ratio.

It is an object of the invention to provide a support for concentric electrodes that maintains the electrode spacing with a high degree of accuracy with change in ambient temperature. A further object is to employ extremely thin electrodes so that expansion and contraction in the thickness thereof with change in temperature are totally insignificant. A further object is to employ thin coatings as electrodes and to apply such coatings to vitreous wall members, usually to concentric cylindrical surfaces thereof, in such a way as to form permanent electrodes substantially immune to attack by chemical action and producing superior results as compared with the thick metallic electrodes previously known.

Still a further object is to provide cells having a small holdup of the fluid being tested. The invention provides electrodes that are spaced only minutely, yet the construction can be such that the entire volume of the cell, including connecting tubes if used, is only two or three times the volume of the test zone between the electrodes. This is of particular importance in continuous systems and is conducive to a very rapid response. It makes possible the use of several cells in series. The possibility of errors introduced by the derivative analog behavior of such consecutive cells when measuring a time-varying function such as conductance is minimized by the designs of the present invention.

Another object is to provide cells that can handle flowing samples or that can be submerged in a flowing stream of the fluid to be tested and which result in no loss of such fluid by spillage or otherwise during the testing. A further object is to test fluid streams without exposure to the atmosphere; also to provide cells which can test flowing streams without contamination of the fluid being tested by such materials as metals from the cell structure, minutely soluble materials in certain plastics, etc. This is particularly important in testing fluids such as fresh water or substantially mineral-free waters where contact with ordinary metals or certain plastic materials will dissolve into the water sufficient contaminating materials to mask the conductivity of the water itself. Use of vitreous wall members, typically of borosilicate glass, noble metal electrodes and other features of the invention cooperate in eliminating such contaminations and insures an accuracy of measurement not heretofore available in commercial conductivity cells.

Still another object is to design a cell for substantially equal longitudinal flow in various peripheral portions of an annular test zone bounded by spaced electrodes; also to provide submergible cells accentuating flow therethrough as a result of relative movement between the cell and the fluid to be tested.

Other objects of the invention are cited in the constructional details of the cells hereinafter described, while still further objects and advantages will be apparent to those skilled in the art from such description and from the appended drawings, in which:

Fig. 1 is a side view of a measuring cell of the invention;

Fig. 2 is a cross-sectional view taken at line 2—2 of Fig. 1 of the drawings;

Fig. 2a is a greatly enlarged sectional view of a fragment of Fig. 2, showing a typical lead construction;

Fig. 3 is a side view of a modified measuring cell of the invention;

Fig. 4 is a cross-sectional view taken at line 4—4 of Fig. 3;

Fig. 5 is an end view of a second modified conductivity cell of the invention;

Fig. 6 is a cross-sectional view taken at line 6—6 of Fig. 5;

Fig. 7 is an end view of a third modified measuring or conductivity cell of the invention; and Fig. 8 is a cross-sectional view taken at line 8—8 of Fig. 7.

Referring particularly to Figs. 1 and 2, the conductivity cell is indicated generally by the numeral 10 and is of the type adapted to be connected in the flow line of any suitable test equipment to receive a flowing stream of the fluid to be tested. The cell 10 is shown as including inner and outer wall members 12 and 14 of substantially cylindrical shape. Means is provided for rigidly mounting the inner wall member 12 concentrically within the outer wall member 14 about a longitudinal axis A—A. This rigid mounting means may be a means serving no function other than to mount the wall members concentrically to define a narrow annular flow passage 15 therebetween. However, in the embodiment of Figs. 1 and 2, this rigid mounting means is in the form of a sealing means 16 closing one end of the flow passage 15. The wall members 12 and 14 and the sealing means 16 are each formed of a vitreous material, by which I have reference to any suitable glass or ceramic material, preferably a grade of glass well adapted to glass blowing operations, e.g., a borosilicate glass capable of withstanding high temperatures. The sealing means 16 is preferably an arch-like member 17 fused to the adjacent ends of the wall members 12 and 14 by a glass-blowing operation.

Because of ease of manufacture and availability, the wall members 12 and 14 are preferably lengths of glass tubing, cylindrical in shape. The width of the annular flow passage 15 never exceeds more than a few millimeters and preferably is within the range of about 1.5–3 mm. It is within the contemplation of the invention, however, to employ wall members of other shape in section, e.g., shapes that are polygonal, oval, etc., so long as these wall members are concentric.

Permanently fixed to the outer surface 18 of the inner wall member 12 is an inner electrode 20. A similar electrode 21 is permanently adhered to the inner surface 22 of the outer wall member 14. The electrodes 20 and 21 are preferably coatings fused to their respective surfaces, these coatings being of a thickness usually less than 1 mm. and often as thin as .1 mm. These coatings bound an annular test zone 23 having open entrance and exit ends 24 and 25 respectively communicating with entrance and exit chambers 26 and 27 at the extremities of the flow passage 15, the entrance chamber 26 being closed by the arch-like member 17.

The invention preferably includes a fluid-entrance means 30 communicating with the entrance chamber 26 and a fluid-exit means 31 communicating with the exit chamber 27, these means being formed of the same vitreous material as the wall members 12 and 14 or of other vitreous material. The invention contemplates that the means 30 and 31 shall be so designed as to flow the fluid to be tested longitudinally through the test zone 23, the forward flow being substantially uniform at all peripheral portions of this test zone. At the same time, it is desirable in the embodiment shown in Figs. 1 and 2 that the inflowing and outflowing streams should advance through entrance and exit passages 32 and 33 substantially axially aligned with the axis A—A. Such entrance and exit passages may be formed by entrance and exit tubes 34 and 35 which, in this embodiment of the invention, serve as a mounting means for the cell, being directly connectible to other test equipment through which flows the stream to be tested.

To produce such uniformity in flow, the fluid-entrance means 30 of Figs. 1 and 2 includes a plurality of branching tubes 36 converging to the passage 32 at one end and communicating with the entrance chamber 26 at the other end through suitable holes in the arch-like member 17. The stream flowing through the entrance passage 32 is thus divided into a plurality of streams which are respectively delivered to the entrance chamber 26 at different peripheral positions. In practice, two branching tubes 36 are usually sufficient to produce the desired uniformity of flow. Such tubes are easily joined to the arch-like member 17 by well-known glass blowing techniques.

To insure uniformity of flow through the test zone 23, the fluid-exit means 31 should also provide for the withdrawal of the fluid from different peripheral portions of the exit chamber 27. To accomplish this, the embodiment of Figs. 1 and 2 provides a dome-like closure 40 for the inner wall member 12 and a domed or tapered closure 41 for the outer wall member 14. These closures are preferably fused to the respective wall members and may be formed by conventional glass-blowing or glass-molding techniques. They are separated to form a tapered flow passage 42 converging in a direction away from the electrodes and opening on the exit passage 33.

It is preferable that the electrodes 20 and 21 be applied to the wall members 12 and 14 before the latter are joined by the sealing means 16. Thus, it is preferred to apply the electrode 21 to the interior of the wall member 14 before or after the latter is connected to the tapered closure 41 and the exit tube 35. Likewise, the electrode 20 is applied to the wall member 12 before or after the closure 40 is in place. Such structures are then accurately assembled and secured in concentric relationship by applying the sealing means 16. If the structure is formed of glass, the tubes 34 and 36 may then be connected, fusing the tubes 36 by well-known methods.

Each of the electrodes 20, 21 is preferably formed of a coating comprising particles of an inert metal. The inert metal should be a noble metal, typically gold or platinum, the latter being hereinafter exemplified. In applying the electrodes, the wall member is merely coated in the appropriate zone, using a brush or a spray, being subsequently baked or fired as hereinafter mentioned. The coating thus applied is preferably a ceramic paint containing minute particles of the noble metal together with a suitable fluxing agent causing a fusion bond between the metal particles and the glass when the coating is baked. Such a ceramic paint may also contain a salt of the noble metal which is reduced in the firing to form a conductive bond between the particles of the platinum. Ceramic paints of this type are well-known in the art of printed circuits. Exemplary of these materials is the Liquid Platinum Alloy No. 130–A manufactured by Hanovia Chemical & Manufacturing Co. of Newark, N. J.

After the coating of any of these materials has been applied, the coating is allowed to air dry to some extent to permit the evaporation of some of the volatile solvent therein, after which the coated wall member is fired at a temperature only slightly below the softening temperature of the wall member. If the wall member is of a borosilicate glass, such as Corning 7040, temperatures of 650°–680° C.. will be found satisfactory. The resulting coating is porous but the conducting particles are sufficiently bridged that the coating has a relatively low electrical resistance, typically a few ohms per square. The usual platinum sheet electrodes must be coated with a plating of platinum soot or black to provide a porous surface so that polarization will not cause errors. The inherent porous nature of my coating makes this unnecessary.

Less desirable electrodes can be produced by coating the wall member with a platinum salt, such as platinum chloride, mixed with oil of cloves and/or with oil of lavender. As before, such a coating is painted on the surface and fired, producing a continuous, smooth, shiny surface. However, this type of surface is definitely inferior in results to the porous surface mentioned above, the latter presenting a much better surface of contact to the flowing fluid in the test zone 23. With any of the aforesaid coatings, however, it should be recognized that the ultimate electrodes are extremely thin, thus occupying a minimum of space in the flow passage 15. At the same time, the coatings are permanently fused to the corresponding wall member and are extremely hard and abrasion resistant.

Leads 45 and 46 are respectively connected to the inner and outer electrodes 20 and 21 in a unique manner, exemplified in Fig. 2a. The lead 46, for example, is first fused into the wall member 14 with a short inner end, suggested by the dotted line 47, extending beyond the surface 22, which is later to receive the electrode 21. The protruding end of the lead is then heated in a localized flame, which tends also to heat the surrounding glass of the member 14. The result of this simple localized heating is the melting of the protruding portion of the lead 47 into a ball-like element 48 resting in a cup-like depression 49 of the glass. The exposed inner portion of the ball-like element 48 is then available to be covered by the coating which, after firing, forms the electrode 21. The result is that the electrode 21 is fused to the ball-like element 48 and the latter is fused to the glass of the member 14.

The cell 10 of Figs. 1 and 2, like the cells later to be described, can be reversed in position so that the fluid will flow therethrough in an opposite direction. This merely reverses the fluid-exit and fluid-entrance means 31 and 30.

In other instances, it is possible to use a branch-tube means, such as the fluid-entrance means 30, at each end of a cell, as suggested in Figs. 3 and 4. This embodiment is particularly useful when it is desired that the fluid being tested shall be equal in temperature to the ambient temperature, as when the complete cell is submerged in a large stream of the fluid to be tested. In the embodiment of Figs. 3 and 4, both entrance and exit ends of the cell are equipped with the branching tubes 36 of Fig. 1, preferably in planes at right angles to each other at the opposed ends. This eliminates the dome-like closure 40 of Fig. 2 and permits the ambient fluid to flow freely through an interior passage 50 formed by the inner wall member 12 from end to end thereof. The fluid enters the passage 50 through a space 51 (Fig. 3) between the branching tubes 36 at one end and discharges from a corresponding space 52 (Fig. 4) between the tubes at the other end. Internal and external streams, respectively flowing along the passage 50 inside the wall member 12 and outside the wall member 14, maintained excellent temperature equilibrium between the fluid flowing interiorly and exteriorly of the flow passage 15 of the cell.

The embodiment of Figs. 3 and 4 is excellently adapted to be positioned within a larger pipe or flow passage to by-pass a portion of the flow through the cell. Any suitable mounting means 53 can be connected to the outer wall member 14, typically one or more arms of streamline shape, preferably holding the cell in the pipe or flow passage with its longitudinal axis A—A substantially parallel to the direction of stream flow. The entrance and exit tubes 34 and 35 are preferably made short and, to accentuate internal flow through the cell, the entrance tube 34 may be forwardly enlarged to form a scoop or funnel 54. If desired, the tubes 36 can be directed individually forward to receive individually two smaller streams either through open forward ends or through scoops or funnels similar to 54 connected individually thereto. All such systems provide for delivery of fluid to be tested to a plurality of points around the entrance chamber 26.

Figs. 3 and 4 also illustrate a divided-electrode structure that can be used with any of the herein-exemplified cells. Here one of the electrodes is made sufficiently extensive to overlie two electrodes. As illustrated, the inner electrode is comprised of electrodes 20a and 20b lying within the confines of the outer electrode 21. Separate leads 45a and 45b are connected to the electrodes 20a and 20b. The areas of the electrodes are such that the cell constant of electrodes 21, 20a is a known multiple of the cell constant of electrodes 21, 20b. Cell constant ratios of 1:10 are desirable and permit testing of a wide range of fluids merely by change in electric connections.

Figs. 5 and 6 illustrate an additional embodiment particularly designed to be mounted in a large pipe or flow passage by means of the mounting means 53, which is here passaged to receive the leads 45 and 46. Here the entrance chamber 26 is open at all peripheral positions to the liquid along the large flow passage in the direction of arrow 55. In this embodiment, the entrance chamber is small or merely the forward part of the annular test zone 23, depending on whether the electrodes 20 and 21 stop short of or extend completely to radially aligned forward faces 56 and 57 of the inner and outer wall members 12 and 14, respectively. The means for rigidly mounting these wall members is here a plurality of spoke-like or post members 58 traversing the flow passage of the cell with passages 59 therebetween to freely conduct the test fluid. The members 58 are preferably of glass with their ends fused to central portions of the wall members 12 and 14. The electrodes 20 and 21 may surround such ends, as shown, so that electrically integral portions of each electrode are on opposite sides of a radial plane passing through the members 58. Alternatively separate pairs of electrodes may be respectively formed on opposite sides of such plane. While a central positioning of the members 58 is preferred, it should be clear that they can be positioned toward or at one or the other end of the annular test zone 23, if desired. The embodiment of Figs. 5 and 6 is particularly useful where maximum freedom of flow of fluid through the cell is desired. This is because the entrance and exit portions of the annular test zone 23 are directly open to the large stream of fluid.

The embodiment of Figs. 7 and 8 is similar to that just described except that the means for rigidly mounting the inner and outer wall members 12 and 14 is an arch-like member 60 similar to the member 17 of Figs. 1 and 2 but disposed close to one end of the electrodes 20 and 21 so as to form only a small entrance chamber 26. Also, the arch-like member 60 provides a plurality of circumferentially spaced openings 61 through which fluid may enter to form a hollow cylindrical stream filling and advancing uniformly along the annular test zone 23 to the open exit end thereof.

This application is a continuation in part of my prior application Serial No. 381,399, filed September 21, 1953 and now abandoned entitled "Apparatus for Measuring the Dissolved Oxygen in Water."

I claim as my invention:

1. A continuous-flow conductivity cell including in combination: inner and outer wall members formed of vitreous material; means for rigidly mounting said inner wall member concentrically within said outer wall member about a longitudinal axis, said inner wall member providing an outer surface spaced substantially uniformly from an inner surface of said outer wall member to form a narrow annular flow passage therebetween extending in the direction of said axis, said rigid mounting means including a vitreous sealing means permanently fused to said wall members and maintaining same in permanently spaced concentric relationship; porous electrodes fused to said outer and inner surfaces respectively, each of said electrodes comprising a thin conductive layer of particles of noble metal, said electrodes being spaced substantially uniformly from each other and defining therebetween a test zone having open entrance and exit ends spaced from each other in the direction of said axis; and leads respectively electrically connected to said coatings.

2. A continuous-flow conductivity cell adapted for submergence in a flowing stream of the fluid to be tested including in combination: an inner wall member formed of vitreous material and having a longitudinal passage therethrough; an outer wall member formed of vitreous material and having a longitudinal passage therethrough; means for rigidly mounting said inner wall member concentric within said passage of said outer wall member about a longitudinal axis, said rigid mounting means having a central opening therein permitting continuous flow of fluid through said passage in said inner wall member, said inner wall member providing an outer surface spaced substantially uniformly from an inner surface of said outer wall member to form a narrow annular flow passage therebetween extending in the direction of said axis; electrodes conforming in shape to and permanently adhered to said outer and inner surfaces respectively, said electrodes being spaced substantially uniformly from each other and defining therebetween a test zone having open entrance and exit ends spaced from each other in the direction of said axis; and leads respectively electrically connected to said coatings.

3. A continuous-flow conductivity cell including in combination: inner and outer cylindrical wall members formed of glass; means for rigidly mounting said inner wall member concentrically within said outer wall member about a longitudinal axis, said inner wall member providing an outer cylindrical surface spaced from an inner cylindrical surface of said outer wall member to form a narrow annular flow passage therebetween extending concentrically with respect to said axis, said rigid mounting means including first glass sealing means permanently fused to adjoining ends of said cylindrical wall member and closing one end of said annular flow passage, except for at least two openings, and second glass sealing means permanently fused to the other adjoining ends of said cylindrical wall members and closing the other end of said annular flow passage, except for at least two openings, said annular flow passage and said openings forming a flow path for the fluid to be tested; thin cylindrical electrodes permanently adhered respectively to said inner and outer cylindrical surfaces in concentric spaced relationship to define an interelectrode test zone forming a part of said flow path and having open entrance and exit ends, said openings of said sealing means opening on said entrance and exit ends respectively; and leads respectively connected to said electrodes.

4. A continuous-flow conductivity cell adapted for submergence in a flowing stream of the fluid to be tested including in combination: inner and outer wall members formed of vitreous material; means for rigidly mounting said inner wall member concentrically within said outer wall member about a longitudinal axis, said inner wall member providing an outer surface spaced substantially uniformly from an inner surface of said outer wall member to form a narrow annular flow passage therebetween extending in the direction of said axis, said rigid mounting means including a vitreous sealing means permanently fused to said wall members and maintaining same in permanently spaced concentric relationship; electrodes conforming in shape to and permanently adhered to said outer and inner surfaces respectively, said electrodes being spaced substantially uniformly from each other and defining therebetween a test zone having open entrance and exit ends spaced from each other in the direction of said axis; leads respectively electrically connected to said coatings; end portions provided by said wall members and extending beyond said open ends of said test zone to form an entrance chamber and an exit chamber at opposite ends of said test zone, each of said open ends communicating openly with one of said chambers; and fluid entrance and fluid exit means respectively communicating with said entrance and said exit chambers, said vitreous sealing means permanently fusing adjoining end portions of said wall members at a position spaced from one of the open ends of said test zone, said fluid entrance means including wall defining an entrance passage substantially in axial alignment with said longitudinal axis and a plurality of branching tubes diverging from said passage to the corresponding chamber and communicating therewith at a corresponding plurality of spaced positions, said passage providing an end portion flaring in an upstream direction to act as a scoop.

5. In a continuous-flow conductivity cell, the combination of: inner and outer wall members formed of vitreous material; an apertured seal of vitreous material permanently fused to said wall members at one end thereof for rigidly mounting said inner wall member concentrically within said outer wall member about a longitudinal axis, said inner wall member providing an outer surface spaced substantially uniformly from an inner surface of said outer wall member to form a narrow annular flow passage therebetween extending in the direction of said axis; first and second conduits of vitreous material and of cross-sectional areas substantially smaller than those of said wall members; a manifold of vitreous material permanently fused to said first conduit and to said seal for providing flow paths between said first conduit and said annular flow passage through said apertured seal; conduit means of vitreous material permanently fused to said second conduit and to said wall members for providing flow paths between said second conduit and said annular flow passage, with said first and second conduits being aligned with said longitudinal axis; electrodes conforming in shape to and permanently adhered to said outer and inner surfaces, respectively, said electrodes being spaced substantially uniformly from each other and defining therebetween an axially extending test zone, said test zone permitting axial flow of fluid between said electrodes; and leads respectively electrically connected to said electrodes.

6. In a continuous-flow conductivity cell, the combination of: inner and outer wall members formed of vitreous material; first and second apertured seals of vitreous material permanently fused to said wall members at each end thereof respectively for rigidly mounting said inner wall member concentrically within said outer wall member about a longitudinal axis, said inner wall member providing an outer surface spaced substantially uniformly from an inner surface of said outer wall member to form a narrow annular flow passage therebetween extending in the direction of said axis; first and second conduits of vitreous material and of cross-sectional areas substantially smaller than those of said wall members; a first manifold of vitreous material permanently fused to said first conduit and said first seal for providing flow paths between said first conduit and said annular flow passage; a second manifold of vitreous material permanently fused to said second conduit and said second seal for providing flow paths between said second conduit and said annular flow passage, with said first and second conduits being aligned with said longitudinal axis; electrodes conforming in shape to and permanently adhered to said outer and inner surfaces, respectively, said electrodes being spaced substantially uniformly from each other and defining therebetween an axially extending test zone, said test zone permitting axial flow of fluid between said electrodes; and leads respectively connected to said electrodes.

7. In a continuous-flow conductivity cell, the combination of: inner and outer wall members formed of vitreous material; an apertured seal of vitreous material permanently fused to said wall members at one end thereof for rigidly mounting said inner wall member concentrically with said outer wall member about a longitudinal axis, said inner wall member providing an outer surface spaced substantially uniformly from an inner surface of said outer wall member to form a narrow annular flow passage therebetween extending in the direction of said axis; first and second conduits of vitreous material and of cross-sectional areas substantially smaller than those of said wall members; a manifold of vitreous material permanently fused to said first conduit and to said seal for providing flow paths between said first conduit and said annular flow passage; a flared section of vitreous material permanently fused between said outer wall member and said second conduit; a cap of vitreous material permanently fused to the other end of said inner wall member for closing same, said flared section and cap coacting to define flow paths connecting said second conduit and said annular flow passage, with said first and second conduits being aligned with said longitudinal axis; electrodes conforming in shape to and permanently adhered to said outer and inner surfaces respectively, said electrodes being spaced substantially uniformly from each other and defining therebetween an axially extending test zone, said test zone permitting axial flow of fluid between said electrodes; and leads respectively electrically connected to said electrodes.

8. A continuous-flow conductivity cell including in combination: inner and outer cylindrical wall members formed of glass; means for rigidly mounting said inner wall member concentrically within said outer wall member about a longitudinal axis, said inner wall member providing an outer cylindrical surface spaced from an inner cylindrical surface of said outer wall member to form a narrow annular flow passage therebetween extending concentrically with respect to said axis, said rigid mounting means including a glass seal permanently fused to adjoining ends of said cylindrical wall members and closing one end of said annular flow passage except for at least two openings forming with said annular flow passage a flow path for the fluid to be tested, said inner wall member and said glass seal having aligned central axial openings therein permitting flow of fluid therethrough; thin cylindrical electrodes permanently adhered respectively to said inner and outer cylindrical surfaces in concentric spaced relationship to define an interelectrode test zone forming a part of said flow path and having open entrance and exit ends, said openings of said seal opening on one of said ends; and leads respectively connected to said electrodes.

References Cited in the file of this patent

UNITED STATES PATENTS

| | | | |
|---|---|---|---|
| 2,108,293 | Perley | Feb. 15, | 1938 |
| 2,229,036 | Bird et al. | Jan. 21, | 1941 |
| 2,599,583 | Robinson et al. | June 10, | 1952 |
| 2,654,862 | Petersen | Oct. 6, | 1953 |